United States Patent
Ohashi

(10) Patent No.: US 12,137,392 B2
(45) Date of Patent: *Nov. 5, 2024

(54) WIRELESS COMMUNICATION SYSTEM, AND WIRELESS COMMUNICATION DEVICE

(71) Applicant: KABUSHIKI KAISHA TOKAI RIKA DENKI SEISAKUSHO, Aichi (JP)

(72) Inventor: Yosuke Ohashi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,038

(22) Filed: Nov. 15, 2023

(65) Prior Publication Data
US 2024/0089702 A1   Mar. 14, 2024

Related U.S. Application Data

(63) Continuation of application No. 17/500,267, filed on Oct. 13, 2021, now Pat. No. 11,856,485.

(30) Foreign Application Priority Data

Oct. 29, 2020 (JP) .................................. 2020-181430

(51) Int. Cl.
*H04W 4/029* (2018.01)
*G01S 5/02* (2010.01)

(52) U.S. Cl.
CPC ........... *H04W 4/029* (2018.02); *G01S 5/0284* (2013.01)

(58) Field of Classification Search
None
See application file for complete search history.

(56) References Cited

U.S. PATENT DOCUMENTS 7,978,049 B2 *  7/2011  Leitch ..................... B60R 25/24
                                                  340/539.23
9,102,296 B2 *  8/2015  Seiberts ................... G07C 9/30
(Continued)

FOREIGN PATENT DOCUMENTS

JP    2009-198374    9/2009
JP    2020-172851    10/2020

*Primary Examiner* — Adolf Dsouza
(74) *Attorney, Agent, or Firm* — GREENBLUM & BERNSTEIN, P.L.C.

(57) ABSTRACT

A wireless communication system includes: a first wireless communication device configured to transmit a first wireless signal and receive a second wireless signal in conformity with a designated communication standard; and at least one second wireless communication device configured to transmit the second wireless signal and receive the first wireless signal in conformity with the designated communication standard. The first wireless communication device and the second wireless communication device perform a designated process more than once on a basis of transmission and reception of the first wireless signal and the second wireless signal. Each of the designated processes includes at least any of transmission and reception of the first wireless signal and the second wireless signal. Moreover, the first wireless signal and the second wireless signal used in the designated processes include secure information for identifying a transmission source of the first wireless communication device.

10 Claims, 2 Drawing Sheets

(56) References Cited

U.S. PATENT DOCUMENTS

| | | | |
|---|---|---|---|
| 9,566,945 B2* | 2/2017 | Ghabra | B60R 25/30 |
| 2014/0330449 A1* | 11/2014 | Oman | B60R 25/245 |
| | | | 701/2 |
| 2021/0139001 A1* | 5/2021 | Knutson | B60R 25/2081 |
| 2021/0246693 A1* | 8/2021 | Elangovan | G06F 21/44 |

* cited by examiner

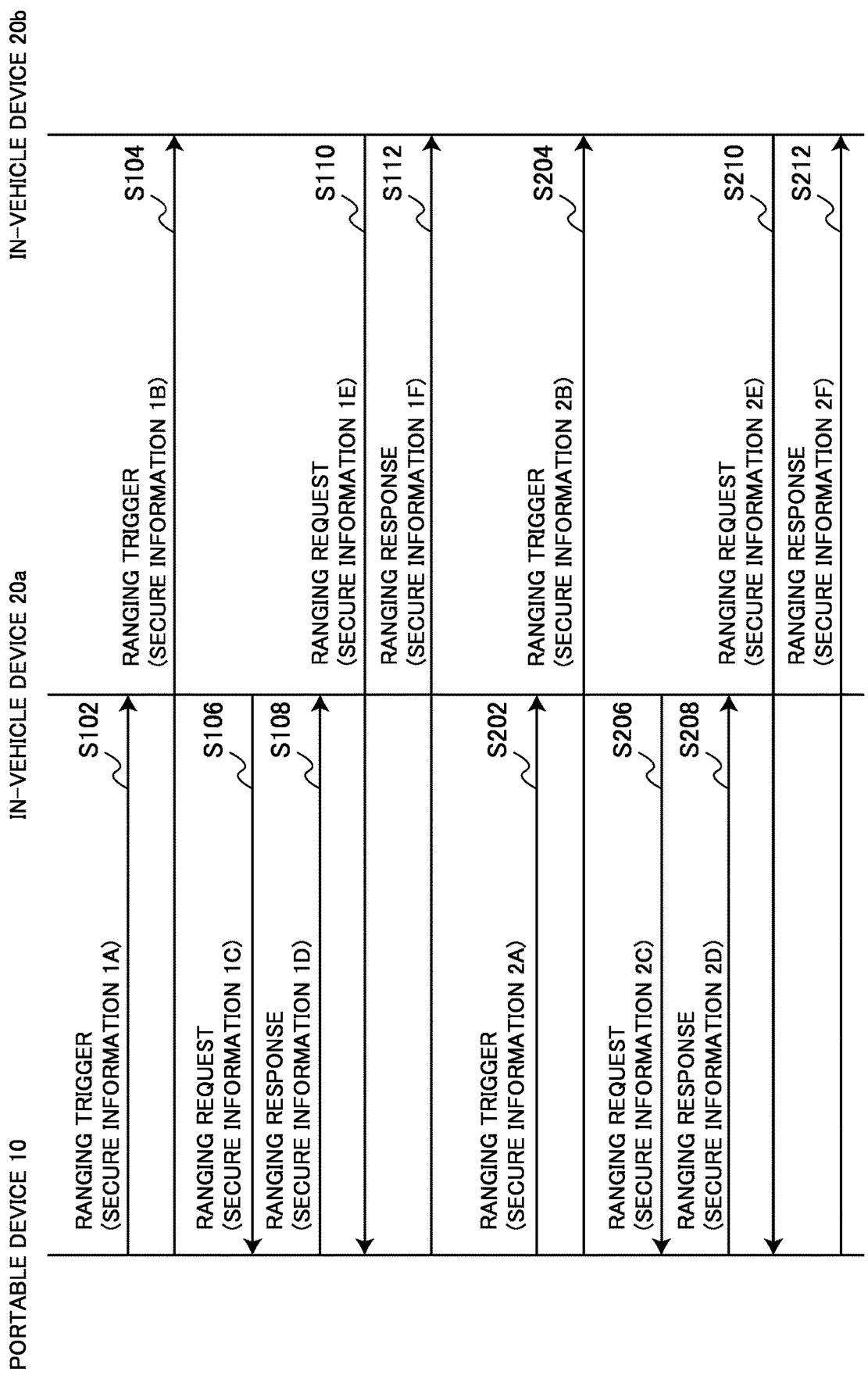

WIRELESS COMMUNICATION SYSTEM, AND WIRELESS COMMUNICATION DEVICE

CROSS REFERENCE TO RELATED APPLICATION(S)

This is a continuation of U.S. patent application Ser. No. 17/500,267, filed Oct. 13, 2021, which claims priority to Japanese Patent Application No. 2020-181430, filed Oct. 29, 2020. The disclosure of each of the above-mentioned documents, including the specification, drawings, and claims, is incorporated herein by reference in its entirety.

BACKGROUND

The present invention relates to a wireless communication system, and a wireless communication device.

In recent years, technologies of estimating a positional relation between devices on the basis of wireless signals transmitted and received between the devices have been developed. For example, U.S. Pat. No. 9,566,945 B2 discloses a technology of estimating a distance between an in-vehicle device and a portable device on the basis of wireless signals transmitted and received between the in-vehicle device and the portable device.

SUMMARY

Here, for example, if wireless signals transmitted from respective in-vehicle device installed in different mobile objects do not include information for identifying transmission sources, it may be impossible for a portable device to determine which in-vehicle device has transmitted the wireless signal received by the portable device.

Accordingly, the present invention is made in view of the aforementioned issue, and an object of the present invention is to clearly determine a transmission source of a wireless signal.

To solve the above-described problems, according to an aspect of the present invention, there is provided a wireless communication system comprising: a first wireless communication device configured to transmit and receive a wireless signal in conformity with a designated communication standard; and at least one second wireless communication device configured to transmit and receive a wireless signal in conformity with the designated communication standard, and wherein the first wireless communication device and the second wireless communication device perform a designated process more than once on a basis of transmission and reception of the wireless signal, each of the designated processes includes at least any of transmission and reception of the wireless signal, and the respective wireless signals used in the designated processes include different pieces of secure information.

In addition, to solve the above-described problems, according to another aspect of the present invention, there is provided a wireless communication device comprising: a wireless communication section configured to transmit and receive a wireless signal to and from another communication device in conformity with a designated communication standard; and a control section configured to control transmission and reception of the wireless signal by the wireless communication section, wherein the control section causes the wireless communication section to transmit the wireless signals including different pieces of secure information in the respective designated processes based on transmission and reception of the wireless signals.

In addition, to solve the above-described problems, according to another aspect of the present invention, there is provided a wireless communication device comprising: a wireless communication section configured to transmit and receive a wireless signal to and from another communication device in conformity with a designated communication standard; and a control section configured to control transmission and reception of the wireless signal by the wireless communication section, wherein, in a case where a piece of secure information included in the wireless signal received by the wireless communication section is admitted as a valid piece of secure information that is predefined for each designated process based on transmission and reception of the wireless signal, the control section causes the wireless communication section to return the wireless signal including a piece of the secure information corresponding to the designated process.

As described above, according to the present invention, it is possible to clearly determine a transmission source of a wireless signal.

BRIEF DESCRIPTION OF THE DRAWINGS

FIG. 2 is a sequence diagram illustrating an example of a flow of a process performed by the wireless communication system 1 according to the embodiment.

DETAILED DESCRIPTION OF THE EMBODIMENT(S)

Figure 1:
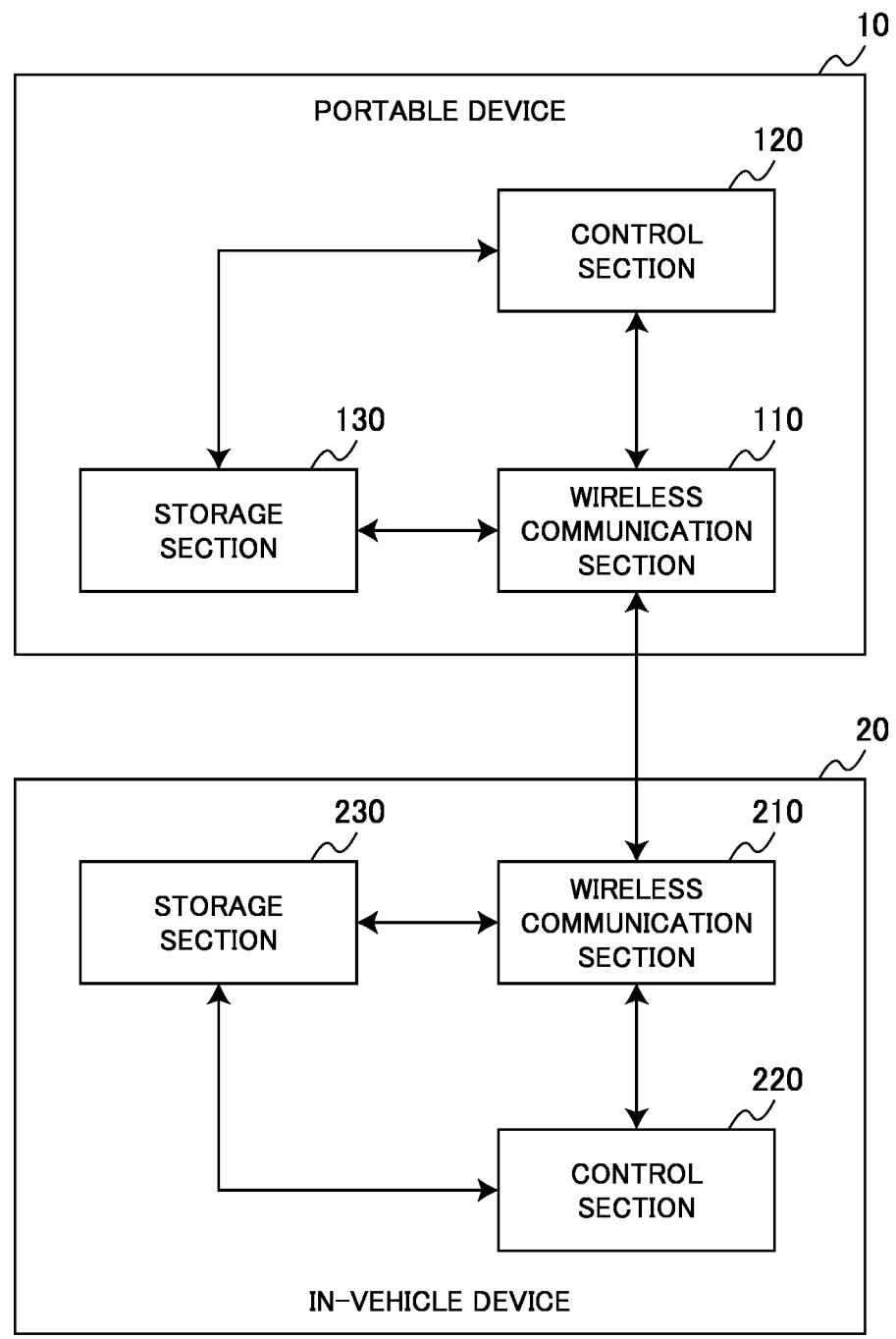
FIG. 1 is a block diagram illustrating a configuration example of a wireless communication system 1 according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1.1. Embodiment

<<1.1.1. System Configuration Example>>

First, a configuration example of a wireless communication system 1 according to an embodiment of the present invention will be described.

FIG. 1 is a block diagram illustrating the configuration example of the wireless communication system 1 according to the present embodiment.

The wireless communication system 1 according to the present embodiment includes a first wireless communication device and at least one second wireless communication device. The first and second wireless communication devices are configured to transmit and receive a wireless signal in conformity with a designated communication standard.

A portable device 10 illustrated in FIG. 1 is an example of the first wireless communication device described above. In addition, an in-vehicle device 20 illustrated in FIG. 1 is an example of the second wireless communication device described above.

(Portable Device 10)

The portable device 10 according to the present embodiment is a wireless communication device configured to be carried by a user.

For example, the portable device 10 may be a smartphone, a tablet, a wearable device, or a dedicated device specialized for use in the wireless communication system 1.

As illustrated in FIG. 1, the portable device 10 according to the present embodiment may include a wireless communication section 110, a control section 120, and a storage section 130.

(Wireless Communication Section 110)

Under the control of the control section 120, the wireless communication section 110 according to the present embodiment transmits and receives wireless signals to and from at least one in-vehicle device 20 in conformity with a designated communication standard.

Examples of the designated communication standard according to the present embodiment include ultra-wideband (UWB) wireless communication.

On the other hand, the designated communication standard according to the present embodiment is not limited thereto. Any communication standard can be adopted as long as it is possible to estimate a positional relation between devices on the basis of wireless signals transmitted and received between the devices.

Other examples of the designated communication standard according to the present embodiment include Wi-Fi (registered trademark), Bluetooth Low Energy (BLE) (registered trademark), and the like.

(Control Section 120)

The control section 120 according to the present embodiment controls transmission and reception of wireless signals by the wireless communication section 110, and a designated process based on the transmission and reception of wireless signals.

The designated process according to the present embodiment may include at least transmission of a request related to the designated process from one of the wireless communication section 110 of the portable device 10 and a wireless communication section 210 of the in-vehicle device 20, and transmission of a response to the request received by the other of the wireless communication section 110 of the portable device 10 and the wireless communication section 210 of the in-vehicle device 20.

Examples of the designated process according to the present embodiment include a process of estimating a positional relation between the portable device 10 and the in-vehicle device 20 (more specifically, between the wireless communication section 110 of the portable device 10 and the wireless communication section 210 of the in-vehicle device 20) on the basis of the transmitted and received wireless signals.

Note that, the positional relation between the portable device 10 and the in-vehicle device 20 includes a distance or an angle between the portable device 10 and the in-vehicle device 20.

For example, the designated process according to the present embodiment may be a process (ranging) of calculating a ranging value, which is an estimated value of the distance between the portable device 10 and the in-vehicle device 20.

Alternatively, for another example, the designated process according to the present embodiment may be a process (angle estimation) of calculating an angle of the portable device 10 with respect to the in-vehicle device 20.

The control section 120 according to the present embodiment cooperates with a control section 220 of the in-vehicle device 20 and performs control in such a manner that the above-described designated process is performed more than once.

At this time, one of features of the control section 120 according to the present embodiment is to perform control in such a manner that wireless signals including different pieces of secure information are transmitted or received in the respective designated processes.

the secure information according to the present embodiment may be various kinds of information to be used for identifying a transmission source that transmits the wireless signal. Examples of the secure information include identifiers of the portable device 10 and the in-vehicle device 20, a random number to be used for hashing operation, and various kinds of key in formation.

For example, the control section 120 according to the present embodiment may cause the wireless communication section 110 to transmit wireless signals including different pieces of secure information in respective designated processes.

In addition, for example, in the case where a piece of secure information included in a wireless signal received by the wireless communication section 110 is admitted as a valid piece of secure information that is predefined for each designated process, the control section 120 according to the present embodiment may cause the wireless communication section 110 to return a wireless signal including a piece of secure information corresponding to the designated process.

Under the above-described control, it is possible to clearly determine which designated process related to transmission from a preset communication partner the wireless signal received by the wireless communication section 110 corresponds to, and it is possible to perform a subsequent process more securely (for example, a process of controlling the mobile object on the basis of the positional relation between the portable device 10 and the in-vehicle device 10).

Note that, the secure information according to the present embodiment may be different for each mobile object provided with at least the in-vehicle device 20.

By using such secure information, it is possible for the control section 120 of the portable device 10 to determine whether or not the in-vehicle device 20 (mobile object provided with the in-vehicle device) that has transmitted the wireless signal is a preset valid communication partner, on the basis of the secure information included in the wireless signal received by the wireless communication section 110.

In addition, the secure information according to the present embodiment may be different for respective in-vehicle devices 20 installed in a single mobile object.

By using such secure information, it is possible for the control section 120 of the portable device 10 to identify which of the in-vehicle devices 20 installed in the mobile object has transmitted the wireless signal, on the basis of the secure information included in the wireless signal received by the wireless communication section 110. This makes it possible to achieve the designated process more accurately.

The functions of the control section 120 according to the present embodiment are implemented by various kinds of processors.

(Storage Section 130)

The storage section 130 according to the present embodiment stores various kinds of information to be used by various structural elements included in the portable device 10.

For example, the storage section 130 according to the present embodiment stores a program to be used by the control section 120.

In addition, the storage section 130 according to the present embodiment stores secure information corresponding to a communication sequence and a communication partner that are decided in advance.

(In-Vehicle Device 20)

The in-vehicle device 20 according to the present embodiment is a wireless communication device configured to be installed in the mobile object such as a vehicle.

At least one in-vehicle device 20 is installed in the mobile object.

As illustrated in FIG. 1, the in-vehicle device 20 according to the present embodiment may include the wireless communication section 210, the control section 220, and a storage section 230.

(Wireless Communication Section 210)

Under the control of the control section 220, the wireless communication section 210 according to the present embodiment transmits and receives wireless signals to and from the portable device 10 in conformity with a designated communication standard.

(Control Section 220)

The control section 220 according to the present embodiment controls transmission and reception of wireless signals by the wireless communication section 210, and a designated process based on the transmission and reception of wireless signals.

For example, the control section 220 according to the present embodiment may cause the wireless communication section 210 to transmit wireless signals including different pieces of secure information in respective designated processes.

In addition, for example, in the case where a piece of secure information included in a wireless signal received by the wireless communication section 210 is admitted as a valid piece of secure information that is predefined for each designated process, the control section 220 according to the present embodiment may cause the wireless communication section 210 to return a wireless signal including a piece of secure information corresponding to the designated process.

Under the above-described control, it is possible to clearly determine which designated process related to transmission from a preset communication partner the wireless signal received by the wireless communication section 210 corresponds to, and it is possible to perform a subsequent process more securely (for example, a process of controlling the mobile object on the basis of the positional relation between the portable device 10 and the in-vehicle device 10).

Note that, in the case where a plurality of in-vehicle devices 20 are installed in the mobile object, the control sections 220 of the respective in-vehicle devices 20 may perform control in such a manner that respective wireless signals including different pieces of secure information are transmitted and received.

Such control allows the control section 120 of the portable device 10 to identify which of the in-vehicle devices 20 installed in the mobile object has transmitted the wireless signal, on the basis of the piece of secure information included in the wireless signal received by the wireless communication section 110. This makes it possible to achieve the designated process more accurately.

The functions of the control section 220 according to the present embodiment are implemented by various kinds of processors.

(Storage Section 230)

The storage section 230 according to the present embodiment stores various kinds of information to be used by various structural elements included in the in-vehicle device 20.

For example, the storage section 230 according to the present embodiment stores a program to be used by the control section 220.

In addition, the storage section 230 according to the present embodiment stores secure information corresponding to a communication sequence and a communication partner that are decided in advance.

The configuration example of the wireless communication system 1 according to the present embodiment has been described above. Note that, the configuration described above with reference to FIG. 1 is a mere example. The configuration of the wireless communication system 1 according to the present embodiment is not limited thereto.

For example, the wireless communication system 1 according to the present embodiment may further include a control device configured to control the mobile object provided with the in-vehicle device 20, on the basis of a result of the above-described designated process and a result of an authentication process that is performed separately from the designated process.

Examples of control of the mobile object include control related to unlocking a door or staring an engine of the mobile object.

In this case, the control device may allow unlocking of the door or starting of the engine in the case where authenticity of the portable device 10 is confirmed through the above-described authentication process and the positional relation between the portable device 10 and the in-vehicle device 20 is confirmed to be within a designated range.

Note that, the authentication process may be based on transmission and reception of wireless signals in a communication standard, which is different from the designated communication standard used for the designated process.

For example, a low frequency (LF) band wireless signal and an ultra high frequency (UHF) band wireless signal may be used for the authentication process.

1.2. Details of Processes

Next, details of the processes performed by the wireless communication system 1 according to the present embodiment will be described with reference to specific examples.

As described above, one of features of the portable device 10 and the control section 20 according to the present embodiment is to execute the designated process once or more on the basis of transmission and reception of the wireless signal, and each of the designated processes includes at least any of transmission and reception of the wireless signal. The respective wireless signals used in the designated processes include different pieces of secure information.

Such a control makes it possible to determine whether or not a transmission source of the received wireless signal is a preset communication partner, and it is possible to achieve the designated process more accurately and securely.

In addition, the portable device 10 and the control section 20 according to the present embodiment may transmit or receive the wireless signal in each designated process. The respective wireless signals used in the designated processes include different pieces of secure information.

In this case, even if a plurality of wireless signals are received from a single device in a single designated process, it is possible to identify the types of the received wireless signals, and it is possible to achieve the designated process accurately and securely in accordance with a preset sequence.

Note that, it may be flexibly decided whether the portable device 10 or the in-vehicle device 20 transmits the request and whether the portable device 10 or the in-vehicle device 20 transmits the response, in accordance with the designated process or in accordance with a sequence in the designated process.

Hereinafter, it is assumed that the designated process according to the present embodiment is a ranging process of calculating a ranging value, which is an estimated value of a distance between the portable device 10 and the in-vehicle device 20.

In addition, hereinafter, a case where the ranging process is performed on the basis of a ranging trigger transmitted from the portable device 10, a ranging request transmitted from the in-vehicle device 20 on the basis of the received ranging trigger, and a ranging response transmitted from the portable device 10 in response to the received ranging request, will be described.

FIG. 2 is a sequence diagram illustrating an example of a flow of a process performed by the wireless communication system 1 according to the present embodiment.

Note that, FIG. 2 illustrates an example in which the wireless communication system 1 includes the portable device 10 and the two in-vehicle devices 20a and 20b. It is assumed that the in-vehicle devices 20a and 20b are installed together in a single mobile object.

In the example illustrated in FIG. 2, under the control of the control section 120, the wireless communication section 110 of the portable device 10 first transmits a ranging trigger including predefined secure information 1A and a ranging trigger including predefined secure information 1B (Step S102 and S104).

Next, a control section 220a of the in-vehicle device 20a determines whether or not secure information included in a ranging trigger received by a wireless communication section 210a in Step S102 is the valid secure information 1A corresponding to the first ranging trigger transmitted from the portable device 10. The portable device 10 is set in advance as a valid communication partner.

Here, in the case where the secure information included in the ranging trigger is admitted as the valid secure information 1A, the control section 220a of the in-vehicle device 20a causes the wireless communication section 210a to transmit a ranging request including predefined secure information 1C (S106).

Next, the control section 120 of the portable device 10 determines whether or not secure information included in a ranging request received by the wireless communication section 110 in Step S106 is the valid secure information 1C corresponding to the first ranging request transmitted from the in-vehicle device 20a. The in-vehicle device 20a is set in advance as a valid communication partner.

Here, in the case where the secure information included in the ranging request is admitted as the valid secure information 1C, the control section 120 of the portable device 10 causes the wireless communication section 110 to transmit a ranging response including predefined secure information 1D (S108).

Next, the control section 220a of the in-vehicle device 20a determines whether or not secure information included in a ranging response received by the wireless communication section 210a in Step S108 is the valid secure information 1D corresponding to the first ranging response transmitted from the portable device 10. The portable device 10 is set in advance as the valid communication partner.

Here, in the case where the secure information included in the ranging response is admitted as the valid secure information 1D, the control section 220a of the in-vehicle device 20a calculates a ranging value on the basis of the ranging request and the ranging response transmitted and received in Step S106 and Step S108 (not illustrated).

On the other hand, a control section 220b of the in-vehicle device 20b determines whether or not secure information included in a ranging trigger received by a wireless communication section 210b in Step S104 is the valid secure information 1B corresponding to the first ranging trigger transmitted from the portable device 10. The portable device 10 is set in advance as the valid communication partner.

Here, in the case where the secure information included in the ranging trigger is admitted as the valid secure information 1B, the control section 220b of the in-vehicle device 20b causes the wireless communication section 210b to transmit a ranging request including predefined secure information 1E (S110).

Next, the control section 120 of the portable device 10 determines whether or not secure information included in a ranging request received by the wireless communication section 110 in Step S110 is the valid secure information 1E corresponding to the first ranging request transmitted from the in-vehicle device 20b. The in-vehicle device 20b is set in advance as the valid communication partner.

Here, in the case where the secure information included in the ranging request is admitted as the valid secure information 1E, the control section 120 of the portable device 10 causes the wireless communication section 110 to transmit a ranging response including predefined secure information 1F (S112).

Next, the control section 220b of the in-vehicle device 20b determines whether or not secure information included in a ranging response received by the wireless communication section 210b in Step S112 is the valid secure information 1F corresponding to the first ranging response transmitted from the portable device 10. The portable device 10 is set in advance as the valid communication partner.

Here, in the case where the secure information included in the ranging response is admitted as the valid secure information 1F, the control section 220b of the in-vehicle device 20b calculates a ranging value on the basis of the ranging request and the ranging response transmitted and received in Step S110 and Step S112 (not illustrated).

Next, under the control of the control section 120, the wireless communication section 110 of the portable device 10 transmits a ranging trigger including predefined secure information 2A and a ranging trigger including predefined secure information 2B (Step S202 and S204).

Next, the control section 220a of the in-vehicle device 20a determines whether or not secure information included in a ranging trigger received by the wireless communication section 210a in Step S202 is the valid secure information 2A corresponding to the second ranging trigger transmitted from the portable device 10. The portable device 10 is set in advance as the valid communication partner.

Here, in the case where the secure information included in the ranging trigger is admitted as the valid secure information 2A, the control section 220a of the in-vehicle device 20a causes the wireless communication section 210a to transmit a ranging request including predefined secure information 2C (S206).

Next, the control section 120 of the portable device 10 determines whether or not secure information included in a ranging request received by the wireless communication section 110 in Step S206 is the valid secure information 2C corresponding to the second ranging request transmitted from the in-vehicle device 20*a*. The in-vehicle device 20*a* is set in advance as the valid communication partner.

Here, in the case where the secure information included in the ranging request is admitted as the valid secure information 2C, the control section 120 of the portable device 10 causes the wireless communication section 110 to transmit a ranging response including predefined secure information 2D (S208).

Next, the control section 220*a* of the in-vehicle device 20*a* determines whether or not secure information included in a ranging response received by the wireless communication section 210*a* in Step S208 is the valid secure information 2D corresponding to the second ranging response transmitted from the portable device 10. The portable device 10 is set in advance as the valid communication partner.

Here, in the case where the secure information included in the ranging response is admitted as the valid secure information 2D, the control section 220*a* of the in-vehicle device 20*a* calculates a ranging value on the basis of the ranging request and the ranging response transmitted and received in Step S206 and Step S208 (not illustrated).

On the other hand, the control section 220*b* of the in-vehicle device 20*b* determines whether or not secure information included in a ranging trigger received by the wireless communication section 210*b* in Step S204 is the valid secure information 2B corresponding to the second ranging trigger transmitted from the portable device 10. The portable device 10 is set in advance as the valid communication partner.

Here, in the case where the secure information included in the ranging trigger is admitted as the valid secure information 2B, the control section 220*b* of the in-vehicle device 20*b* causes the wireless communication section 210*b* to transmit a ranging request including predefined secure information 2E (S210).

Next, the control section 120 of the portable device 10 determines whether or not secure information included in a ranging request received by the wireless communication section 110 in Step S210 is the valid secure information 2E corresponding to the second ranging request transmitted from the in-vehicle device 20*b*. The in-vehicle device 20*b* is set in advance as the valid communication partner.

Here, in the case where the secure information included in the ranging request is admitted as the valid secure information 2E, the control section 120 of the portable device 10 causes the wireless communication section 110 to transmit a ranging response including predefined secure information 2F (S212).

Next, the control section 220*b* of the in-vehicle device 20*b* determines whether or not secure information included in a ranging response received by the wireless communication section 210*b* in Step S212 is the valid secure information 2F corresponding to the second ranging response transmitted from the portable device 10. The portable device 10 is set in advance as the valid communication partner.

Here, in the case where the secure information included in the ranging response is admitted as the valid secure information 2F, the control section 220*b* of the in-vehicle device 20*b* calculates a ranging value on the basis of the ranging request and the ranging response transmitted and received in Step S210 and Step S212 (not illustrated).

The examples of the flow of the process performed by the wireless communication system 1 according to the present embodiment have been described above in detail.

Note that, FIG. 2 illustrates the example in which the portable device 10 transmits the ranging triggers. However, it is also possible for the in-vehicle device 20 to transmit the ranging triggers.

In this case, the portable device 10 transmits the ranging requests, and the in-vehicle device 20 transmits the ranging responses.

On the other hand, the ranging process according to the present embodiment does not necessarily include the ranging triggers.

For example, the ranging process according to the present embodiment may be achieved by using a first ranging signal transmitted from one of the devices, a second ranging signal transmitted from the other of the devices as a response to the first ranging signal, and a third ranging signal transmitted from one of the devices as a response to the second ranging signal.

In this case, it is also possible to calculate a ranging value based on the first ranging signal and the second ranging signal, and a ranging value based on the second ranging signal and the third ranging signal.

2. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

Note that, the series of processes performed by the respective devices described in this specification may be implemented by any of software, hardware, and a combination of software and hardware. A program that configures the software is stored in advance in, for example, a non-transitory computer readable storage medium installed inside or outside each of the devices. In addition, for example, when a computer executes each of the programs, the program is loaded into RAM, and executed by a processor such as a CPU. The storage medium may be a magnetic disk, an optical disc, a magneto-optical disc, flash memory, or the like, for example. Alternatively, the above-described computer program may be distributed via a network without using the storage medium, for example.

What is claimed is:

1. A wireless communication system, comprising:
    a first wireless communication device configured to transmit a first wireless signal and receive a second wireless signal in conformity with a designated communication standard; and
    at least one second wireless communication device configured to transmit the second wireless signal and receive the first wireless signal in conformity with the designated communication standard,
    wherein the first wireless communication device and the second wireless communication device perform a designated process more than once on a basis of transmission and reception of the first wireless signal and the second wireless signal,
    each of the designated processes includes at least any of transmission and reception of the first wireless signal and the second wireless signal, and
    the first wireless signal and the second wireless signal used in the designated processes include secure information for identifying a transmission source of the first wireless communication device.

2. The wireless communication system according to claim 1,
wherein, in the designated process, the first wireless communication device and the second wireless communication device at least transmit or receive the first wireless signal and the second wireless signal including different pieces of the secure information.

3. The wireless communication system according to claim 2,
wherein the designated process includes at least transmission of a request related to the designated process from one of the first wireless communication device and the second wireless communication device, and transmission of a response to the request received by an other of the first wireless communication device and the second wireless communication device.

4. The wireless communication system according to claim 3,
wherein the designated process includes a process of estimating a positional relation between the first wireless communication device and the second wireless communication device.

5. The wireless communication system according to claim 4,
wherein the designated process includes a process of calculating a ranging value that is an estimated value of a distance between the first wireless communication device and the second wireless communication device.

6. The wireless communication system according to claim 1, further comprising:
a plurality of the second wireless communication device,
wherein each of the plurality of the second wireless communication device transmits and receives respective wireless signals including one or more of different pieces of secure information.

7. The wireless communication system according to claim 1, wherein
the first wireless communication device is configured to be carried by a user, and
the second wireless communication device is configured to be installed in a mobile object.

8. The wireless communication system according to claim 1,
wherein the designated communication standard includes ultra-wideband wireless communication.

9. A wireless communication device, comprising:
a wireless communicator configured to transmit a first wireless signal and receive a second wireless signal to and from another wireless communication device in conformity with a designated communication standard; and
a controller configured to control transmission and reception of the first wireless signal and the second wireless signal by the wireless communicator,
wherein the controller causes the wireless communicator to transmit the first wireless signal and the second wireless signal including one or more different pieces of secure information in respective designated processes based on transmission and reception of the first wireless signal and the second wireless signal, and
the first wireless signal and the second wireless signal used in the respective designated processes include secure information for identifying a transmission source of the first wireless communication device.

10. A wireless communication device, comprising:
a wireless communicator configured to transmit a first wireless signal and receive a second wireless signal to and from a second wireless communication device in conformity with a designated communication standard; and
a controller configured to control transmission and reception of the first wireless signal and the second wireless signal by the wireless communicator,
wherein, in a case where a piece of secure information included in the second wireless signal received by the wireless communicator is admitted as a valid piece of secure information that is predefined for each designated process based on transmission and reception of the first wireless signal and the second wireless signal, the controller causes the wireless communicator to return the first wireless signal including a piece of the secure information corresponding to the designated process, and
the first wireless signal and the second wireless signal used in the respective designated processes include secure information for identifying a transmission source of the second wireless communication device.

* * * * *